Patented Feb. 12, 1952

2,585,501

UNITED STATES PATENT OFFICE 2,585,501

MANUFACTURE OF CHEESE

Louis Leon Rusoff and Alcee Joseph Gelpi, Jr., Baton Rouge, La., assignors to Board of Supervisors of Louisiana State University and Agricultural and Mechanical College, Baton Rouge, La.

No Drawing. Application January 30, 1951, Serial No. 208,664

4 Claims. (Cl. 99—116)

This invention relates to the manufacture of cheddar cheese or other types which, before curing, have applied thereto a coating of paraffin or other impervious material. During the curing, certain chemical reactions take place which render the cheese more palatable and digestible. The reactions referred to are dependent upon enzyme action, which is affected by time, temperature and moisture. Unfortunately, these same conditions which are necessary for ripening, also favor the development of mold or other microorganisms on tne surface of the cheese. This is undesirable, since discoloration on the surface and injury to the rind cause a lowering of the quality and a decrease of the sale price. These factors have always been a serious economic problem to the cheese industry, particularly where climatic conditions, such as high temperature, are adverse to normal cheese ripening.

Most types of cheese made in this country, especially cheddar and cream cheese, cure best at temperatures in the general range of from 50° to 60° F., and humidity of 90% of saturation, but these conditions cause surface defects. The problem has been partially overcome by curing cheese at a temperature of 35° to 40° F., which tends to prevent or relay mold growth, but on the other hand, it also delays or even prevents normal cheese ripening. As the curing time is lengthened the cost of production increases, and even after prolonged curing much of this cheese reaches the market with the undesirable characteristics of green or uncured cheese.

The main objects of the present invention are to reduce the cost of manufacture, reduce the time required for ripening, and insure the production of a better product.

We have discovered that the presence of antibiotics on the surface of cheddar cheese has no effect on the curing of the cheese, but permits the use of a higher temperature during curing, and therefore shortens the curing time and lowers the cost of manufacture.

In carrying out our invention the procedure may be as follows:

The cheddar cheese may be made according to standard methods, and a few days thereafter the cheese is removed from the press, the cap cloths are removed, and all surfaces are wiped clean and dried. The cheese may then be treated with the antibiotic solution. This may be done my momentarily immersing the cheese in a vat containing the antibiotic solution, or the solution may be sprayed or brushed on the surface. The cheese is then allowed to dry, preferably at room temperature. After drying, which may take approximately an hour, an impervious coating is applied. This coating is preferably paraffin, and may be applied by dipping the cheese in melted paraffin having a temperature of about 220° F., and for only a few seconds. It is then placed on shelves in a curing room, and held at about 55° to 60° F. in an atmosphere containing about 90% humidity.

Various antibiotics may be used, and the concentration of the solution will vary with the antibiotic used. For example, we may use sulfanilamide (0.5% solution), aureomycin (4% solution), streptomycin (10% solution), penicillin 2,000,000 units per 50 cc. of water), or a mixture of two or more of these antibiotics, or we may use other well known antibiotics.

Although this treatment has no effect on the curing time at a given temperature, we have discovered that it permits the cheese to be cured at a higher temperature, and during a shorter period of time. For instance, the curing temperature which is usually about 40° to 50° F. may be increased to 55° to 60° F., and the time of curing may be shortened from about eight months or more to three to five months. This substantially reduces the cost of manufacture of the cheese.

Thereafter, the cheese is coated with paraffin to prevent the evaporation of moisture. As a result of this treatment, the surface of the cheese shows no mold growth or evidence of microbial activity.

In the example above given the paraffin is applied after the treatment with the antibiotic solution. By incorporating the antibiotic in the paraffin or other coating material the treating and the coating may be combined into a single step.

Having thus described our invention, what we claim as new and desire to secure by Letters Patent is:

1. The process of treating cheese prior to curing, which includes the steps of applying an antibiotic solution to the surface of the cheese, and drying the surface.

2. The process of treating cheese which includes the steps of applying an antibiotic solution to the surface of the cheese, drying the surface, and applying a moisture impervious coating, whereby the curing time is reduced and a higher curing temperature may be employed.

3. The process of treating cheese which includes the steps of applying an antibiotic solution to the surface of the cheese, drying the surface, applying a moisture impervious coating, and curing at a temperature of 55° to 60° F. for not to exceed about five months.

4. The process of treating cheese which includes the steps of applying to the surface of the cheese a moisture impervious coating containing an antibiotic compound.

LOUIS LEON RUSOFF.
     ALCEE JOSEPH GELPI, Jr.

REFERENCES CITED

The following references are of record in the file of this patent:

UNITED STATES PATENTS

| Number | Name | Date |
|---|---|---|
| 2,336,358 | Ingle | Dec. 7, 1943 |
| 2,412,596 | Bauer et al. | Dec. 17, 1946 |

OTHER REFERENCES

"Antibiotics Effectively Retard Bacterial Spoilage of Fish," Food Industries, October 1950, page 126.